Nov. 25, 1952   B. W. MERRILL   2,619,217
ARTICLE TIMING AND INDEXING MECHANISM
Filed Feb. 13, 1952   4 Sheets-Sheet 1

FIG. I

INVENTOR:
BENNETT W. MERRILL.
BY
Joseph B. Lindecker,
ATTORNEY

Nov. 25, 1952 B. W. MERRILL 2,619,217
ARTICLE TIMING AND INDEXING MECHANISM
Filed Feb. 13, 1952 4 Sheets-Sheet 2

INVENTOR:
BENNETT W. MERRILL.
BY
Joseph B. Lindecker
ATTORNEY

Nov. 25, 1952 B. W. MERRILL 2,619,217
ARTICLE TIMING AND INDEXING MECHANISM
Filed Feb. 13, 1952 4 Sheets-Sheet 3

INVENTOR:
BENNETT W. MERRILL.
BY
Joseph B. Lindecker.
ATTORNEY

Nov. 25, 1952 B. W. MERRILL 2,619,217
ARTICLE TIMING AND INDEXING MECHANISM
Filed Feb. 13, 1952 4 Sheets-Sheet 4

INVENTOR:
BENNETT W. MERRILL.
BY
Joseph B. Lindecker
ATTORNEY

Patented Nov. 25, 1952

2,619,217

UNITED STATES PATENT OFFICE 2,619,217

ARTICLE TIMING AND INDEXING MECHANISM

Bennett W. Merrill, Chicago, Ill., assignor to Standard Packaging Corporation, Chicago, Ill., a corporation of Virginia Application February 13, 1952, Serial No. 271,354

16 Claims. (Cl. 198—34)

1

The present invention relates to timing and indexing mechanisms for use with articles which are positioned at random on a conveyor and has particular reference to a mechanism wherein filled bottles which are incorrectly positioned on the conveyor are repositioned in indexed, or timed relation, whereby they may be fed continuously and in succession to a rotating transfer wheel for conducting them to a bottle closure sealing mechanism or the like.

In certain types of machines it is extremely difficult to maintain moving articles and parts in their proper synchronism during their cycle of operations. By way of example, one such machine may include a long metallic link conveyor chain which is adapted to operate in synchronism with other moving parts such as a transfer wheel, or the like of a machine, the transfer wheel for removing an article conveyed from the conveyor chain and to place the article upon a machine part where the article is to be further worked upon. When such a conveyor chain is subjected to conditions where oil, grease, milk, water and the like are allowed to accumulate upon the upper surface during the operating cycle thereof, the articles carried upon the conveyor chain and conveyed thereby are caused to slip rearwardly thereon due to lack of friction between the article and the conveyor chain and hence this action throws the articles on the conveyor out of synchronism with the transfer wheel or other associated mechanisms, causing the articles to be crushed and/or damaged.

This invention contemplates a mechanism which is particularly suitable for use with articles such as filled glass bottles, or the like, and which may be installed adjacent a conveyor connecting different machines in line, as for example, a bottle filling machine and a bottle closure applying and sealing machine, wherein the discharge of bottles from the first machine is not timed with the operation of the second machine. In such a situation, it is essential that the filled bottles be accurately indexed into the second machine to avoid the possibility of having them crushed by the rotating transfer wheel of the second machine. The mechanism will cause the bottle or bottles to move, at the proper time, along with said conveyor chain preventing the bottles from slipping upon the conveyor chain and thus indexing and properly positioning said bottles to place them in synchronism with the transfer wheel of said second machine.

The mechanism is designed so that a row of abutting bottles may be safely fed by the conveyor chain to a transfer wheel providing the first container in the row is properly indexed. The timing wheel thereof operates to index the first bottle in such a row, and is thereafter positioned between adjacent bottles and smoothly operated by the friction drive and ratchet wheel mechanisms without disturbing the continuous flow of the bottles. When a break in the continuity of the row occurs, due to the slipping of the bottles rearwardly, or for other reasons, the timing wheel once more operates through the joint action of the friction drive and ratchet wheel control, to time and/or correct the position of the next bottle to be fed to it, should such correction be necessary.

An object therefore of the invention is to provide an indexing mechanism which stops the advance of a bottle which is untimed and/or mispositioned on a continuously moving conveyor chain until it is properly positioned on the latter, and then assists the bottle in its movement forward.

A further object is to provide an indexing and/or a timing mechanism wherein the indexing operation is performed entirely through the power driven timing wheel and its associated parts without any action of the bottle.

Numerous other objects and advantages of the invention will be apparent as it is better understood from the following description which, taken in connection with the accompanying drawings, discloses a preferred embodiment thereof.

Referring to the drawings.

Figure 1:
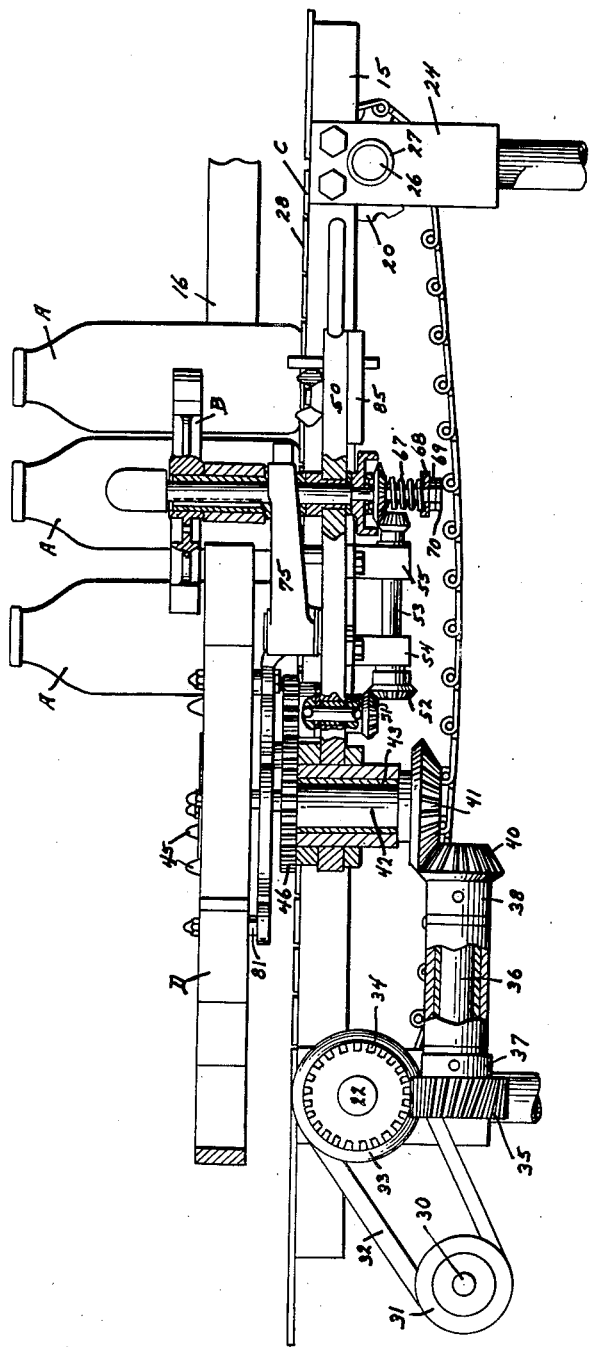
Figure 1 is a side elevational view of a conveyor embodying a power driven conveyor chain and a timing mechanism constructed in accordance with the principles of the present invention, parts being broken away.
Figure 2:
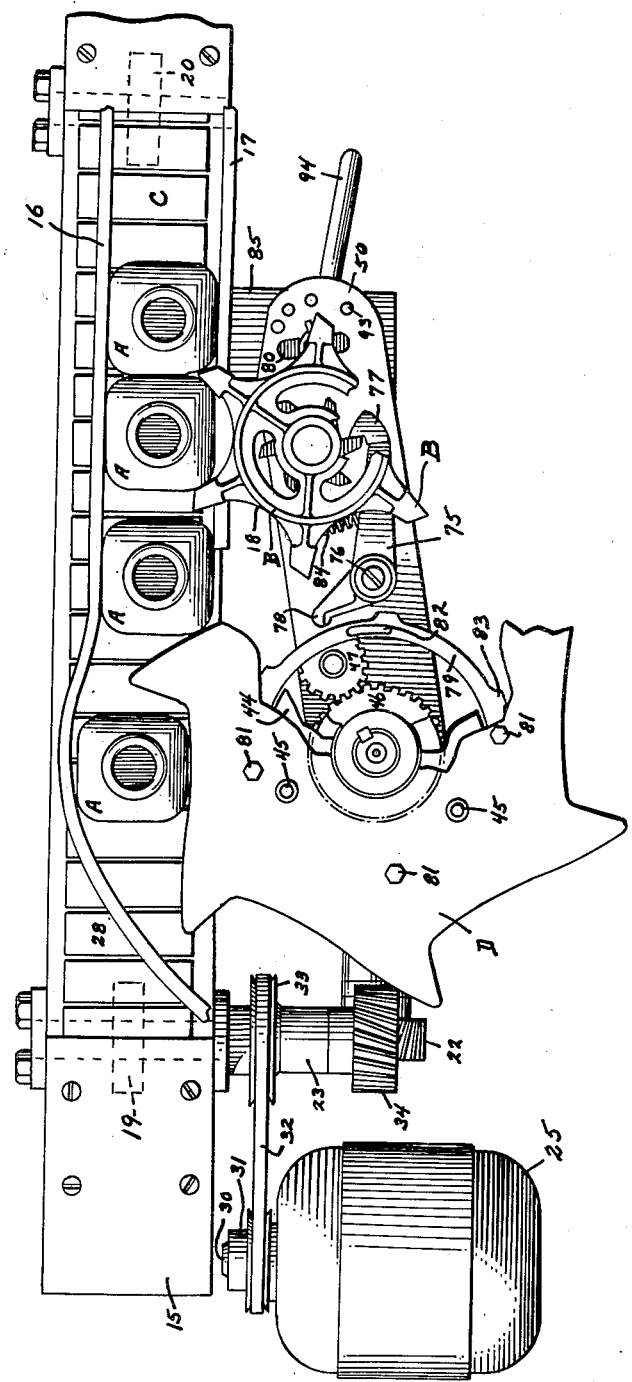
Figure 2 is a top plan view of the conveyor and associated timing mechanism as shown in Figure 1, parts being broken away.
Figure 3:
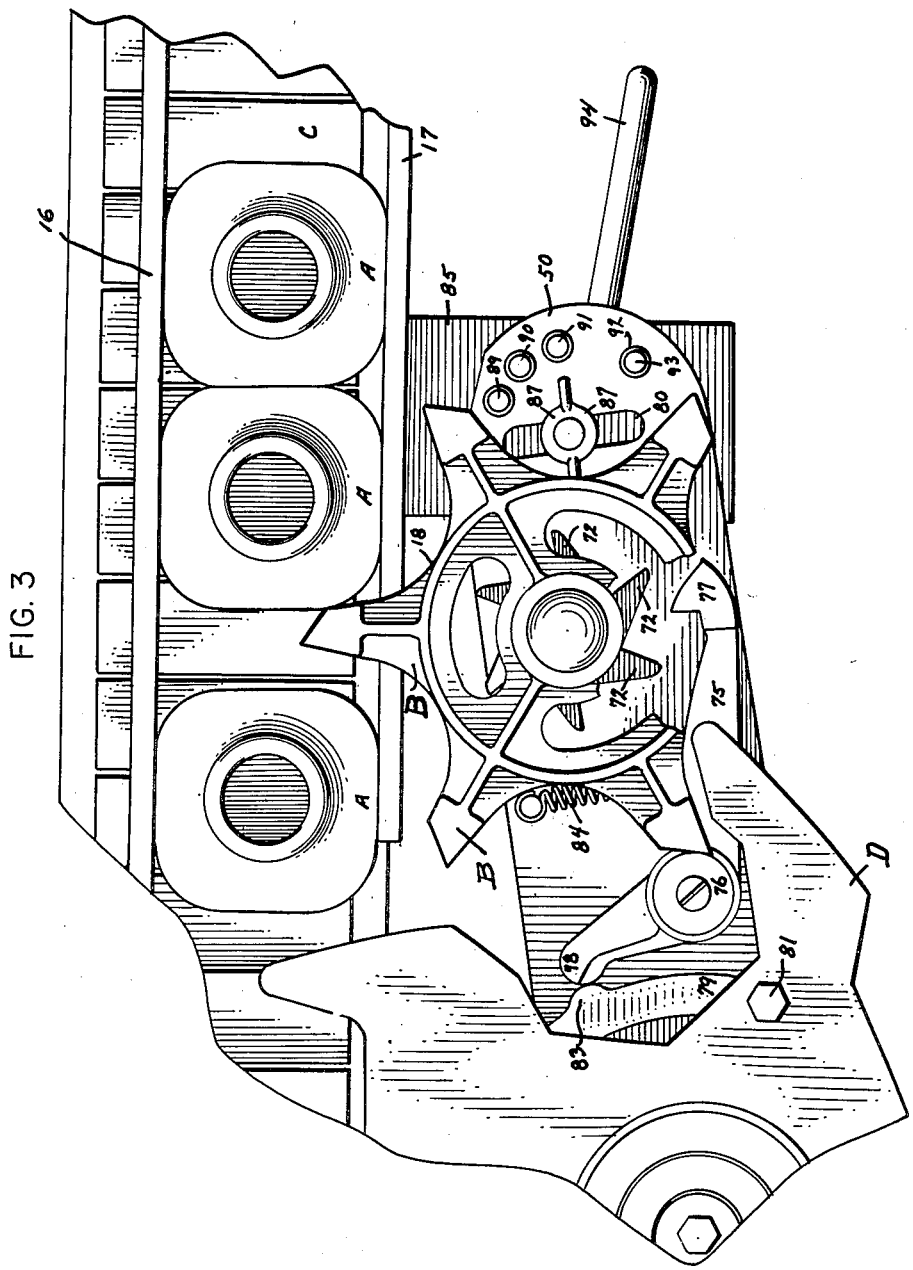
Figure 3 is an enlarged fragmentary view similar to Figure 2 but showing the timing wheel in a different operating position, parts being broken away.
Figure 4:
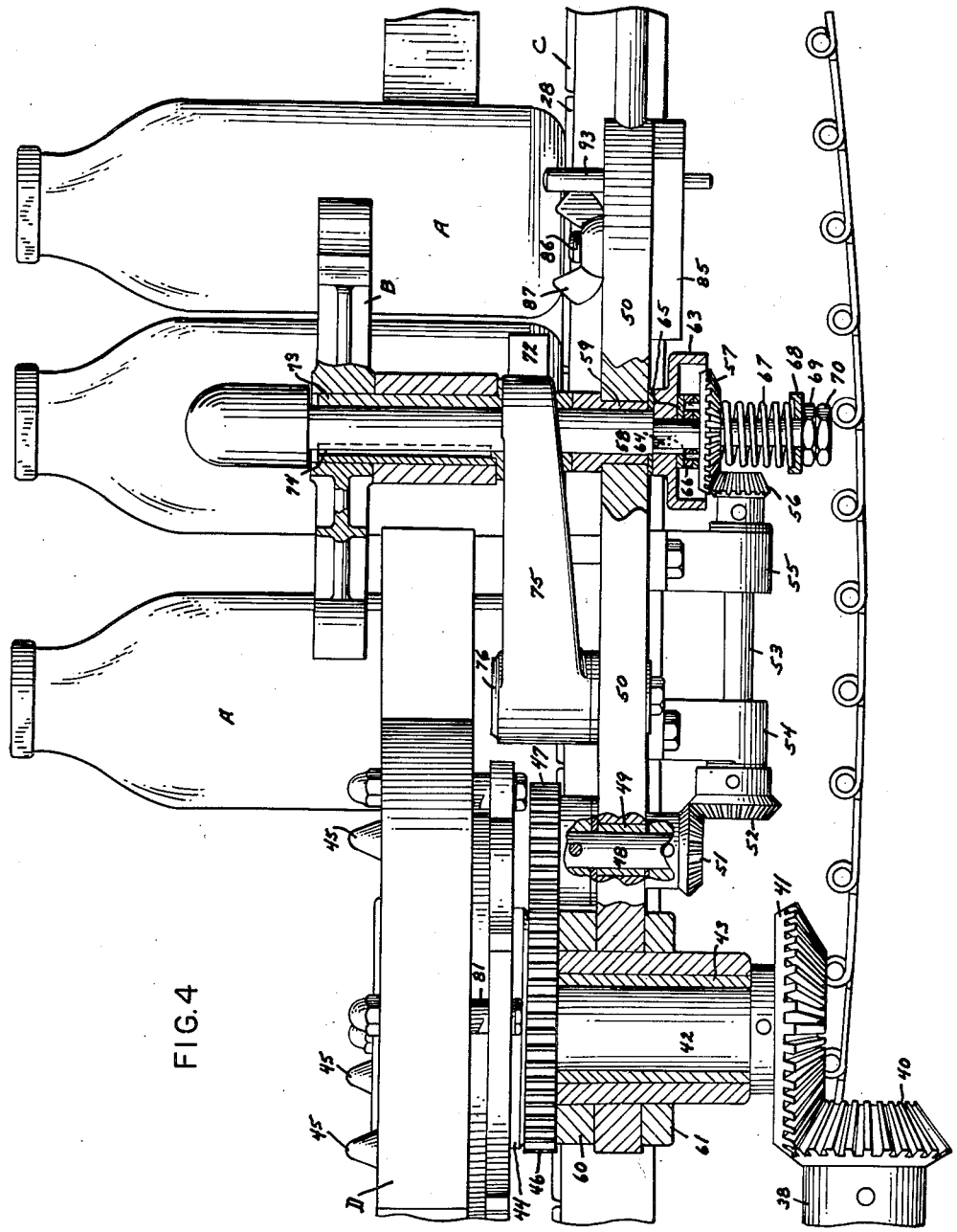
Figure 4 is an enlarged fragmentary view similar to Figure 1, parts being broken away.

As an exemplary embodiment of the present invention the drawings illustrate an article or bottle handling mechanism in which bottles A are carried by a conveyor chain, they are advanced at random or in untimed position from a suitable source of supply, they are carried to and received by a timing wheel B where they are placed in predetermined positions on said conveyor chain, a long moving endless conveyor chain C. At a desired location the bottles may be removed from said conveyor chain by a transfer wheel D or other suitable means and thus discharged to a bottle closure sealing mechanism or the like.

In the present embodiment of the invention, the bottles A are shown to have flat sides, although it should be understood that the present invention is capable of use with bottles of round and other shapes.

In the illustrated embodiment of the invention, each bottle A is advanced along the conveyor 15 by the conveyor chain C and maintained in single file or line by the conveyor guide rails 16 and 17 which are secured to the conveyor.

The timing wheel B is located adjacent one side of the conveyor near the inlet end thereof and is partially disposed above the guide rail 17 and over said conveyor chain C. Said timing wheel B is provided with spaced pockets 18 which receive individual bottles moving along the conveyor 15. The power driven timing wheel B propels and spaces the bottles so they are accurately indexed upon the conveyor chain C as they are carried to the transfer wheel D where they may be discharged to a bottle closure sealing mechanism.

The conveyor chain C rides over and is pulled by a drive sprocket wheel 19 located at the discharge end of the conveyor, and rides over idler sprocket 20 which is located at the opposite end of the conveyor. The drive sprocket 19 is mounted on the other end of a conveyor driving shaft 22 journaled in bearing 23 mounted on the conveyor frame 24. The driving shaft 22 is rotated from any suitable source of power, such as an electric motor 25. The idler sprocket 20 is mounted on an idler shaft 26 journaled in bearing 27 mounted on the conveyor frame 24 near the inlet end thereof. The upper flights 28 of the conveyor chain extend above the stationary conveyor 15 so that the lower surface of said flights engage and slide along in a taut level condition so as to support the bottles A as they are guided along by said guide rails 16 and 17.

The timing wheel B hereinbefore mentioned is power driven through a slip clutch mechanism which is geared and timed with the transfer wheel D, and driven by said motor 25. The motor 25 is provided with a rotor shaft 30 carrying a pulley 31 which drives a belt 32 in the usual manner. The belt 32 drives a pulley 33 mounted and secured to said conveyor drive shaft 22 intermediate its ends. The inner end of the shaft 22 carries a helical gear 34 which drives a helical gear 35 mounted on the outer end of an auxiliary drive shaft 36 which extends parallel with the conveyor 15 and is journaled in bearings 37 and 38 carried by the main frame. The inner end of the shaft 36 carries a bevel gear 40 which drives a bevel gear 41 mounted on the lower end of a vertical shaft 42 carried in bearing 43. The upper end of the shaft 42 has secured thereto a hub 44. Said hub 44 has a plurality of vertical pins 45 arranged in its upper surface, said pins 45 being equally spaced and arranged to be inserted into vertically arranged holes in the transfer wheel D when said transfer wheel is placed upon said hub 44. The transfer wheel is removable, as different size transfer wheels are often required for different size bottles.

Attached to the underside of said hub 44 is secured a spur gear 46 which drives a pinion gear 47 mounted on the upper end of a vertical shaft 48 journaled in a bearing 49 secured to mechanism frame member 50. Shaft 48 has a bevel gear 51 secured at its lower end which drives a bevel gear 52 mounted on the outer end of an auxiliary horizontal drive shaft 53. The shaft 53 is journaled in bearings 54 and 55 secured to said timing mechanism frame member 50. Said frame member 50 is a flat horizontally arranged plate member which is rotatably mounted in a suitable manner about shaft 42 and spaced below said gear 46 by suitable members 60 and 61. The inner end of the auxiliary drive shaft 53 carries a bevel gear 56 which meshes with a bevel gear 57 mounted upon the vertical timing wheel shaft 58, said gear 57 is spaced a short distance above the lower end of said shaft but not rigidly secured thereto. The shaft 58 is journaled in a bearing 59 carried by said mechanism frame member 50. Below said frame member 50 is a coupling 63 which is secured to said shaft 58 by a key 64. A friction washer 65 is mounted upon the under side of said coupling 63. Directly beneath and in contact with said washer 65 is a friction washer 66 which is secured to the upper side of the horizontally arranged bevel gear 57 freely mounted upon shaft 58. Directly below said bevel gear 57 is arranged a compression spring 67 mounted upon the lower end of shaft 58 and secured in position by means of a washer 68, an adjusting nut 69, and a lock nut 70. Therefore, the rotation of bevel gear 57 causes the rotation of coupling 63 through the friction washers 66 and 69 because of the pressure exerted by the spring 67. The compression pressure of the spring 67 may be governed by adjusting the location of the nut 69 and securing it in locked position by the nut 70.

Mounted directly above said mechanism frame member 50 and around said shaft 58 is a ratchet wheel 72 secured to a sleeve member 73 which surrounds the upper end portion of said timing wheel shaft 58 and drives the timing wheel B which is keyed to said sleeve 73 by a key 74. Therefore, the rotation of said bevel gear 57 causes rotation of the coupling 63 which in turn causes rotation of the shaft 58 which in turn causes the rotation of said sleeve 73 and the timing wheel B.

Associated with said ratchet wheel 72 is a rocker arm, or ratchet lever 75 rotatably mounted in a bushing surrounding a bolt 76 vertically secured to said frame member 50. One end of said lever 75 has a detent 77 which falls in between the teeth of said ratchet wheel 72. The opposite end of said lever 75 has a rounded projecting portion 78 shaped to ride upon the cam surface of cam 79.

The transfer wheel D has secured to its lower surface a plate cam 79 secured thereto by means of a plurality of bolts 81. Said cam has a plurality of circular slots 82 for receiving said bolts 81 whereby the cam 79 can be rotatably adjusted with relation to said transfer wheel D.

The projecting parts 83 of said cam 79 gives alternate motion to said lever end portion 78 as said end is kept in substantially close contact with the cam by means of a tension spring 84, one end of said spring being secured to the frame member 50 and the other end thereof being secured to the ratchet lever 75. Therefore, said spring 84 causes one end of lever 75 to ride upon the cam 79 and the opposite end of the lever 75 to force said detent 77 in between the teeth of said ratchet wheel 72.

The entire mechanism is adjustable for indexing any size or shape of bottles by removing and replacing the timing wheel B and transfer wheel D with wheels of a necessary size corresponding to the bottles to be used therewith. It is also necessary to adjust the location of the timing wheel with relation to the conveyor. The free end of said timing mechanism frame member 50 rides upon a plate member 85 extending from and secured to the conveyor 15. Said frame member 50 has a circular slot 88 adjacent its free end and is adapted to receive a vertically projecting bolt 86 secured to said plate 85, said bolt 86 having threads upon its upper end to receive a clamp wing nut 87. Said frame member 50 is also provided with a plurality of holes 89, 90, 91 and 92. Said plate 85 has a hole arranged therein to be in alignment with said holes 89, 90, 91 and 92. A removable pin 93 is provided to fit into any one of said holes in member 50 and with the hole located beneath in said plate 85. Therefore, if half pint bottles are to be passed along on the conveyor, the timing wheel B must be positioned nearer to the conveyor. Said pin 93 is then removed, wing nut 87 is loosened, the plate member 50 is moved toward the conveyor and held in position by grasping handle member 94 arranged in the free end of said plate 50. Said pin 93 is then inserted through hole 92 and into the hole beneath it in said plate 50, after which the wing nut 87 is again tightened by turning it downwardly into contact with member 50. In a similar manner, the mechanism may be adjusted to index pint bottles, quart bottles, and half gallon bottles. This is done by loosening the wing nut 87, placing the pin 93 in the proper hole and then again tightening the wing nut 87. The mechanism can be varied to index larger or smaller bottles than those described above without departing from the invention.

In the illustrated embodiment of the invention, each bottle A is advanced along the conveyor 15 by the conveyor chain C, the bottle having previously been placed upon the chain in random position in any suitable manner, for example, by the discharge mechanism of a filling machine. As each bottle advances along the conveyor 15, its forward progress is momentarily halted if it is not properly timed. Said bottle will come in contact with one of the projections of the timing wheel and held stationary until it is time for it to move into one of the pockets of the timing wheel. While said bottle is held stationary the timing wheel does not move as it is held stationary by the locking action of the detent on lever 75 with the ratchet wheel 72. This action prevents the coupling 63 from turning and as a result there is a slipping action between the friction washers 65 and 66. This allows all the other driving parts to continue in motion, said parts and said conveyor chain being constantly driven by said electric motor 25. When it is time for the bottle to be moved forward with the moving conveyor chain to the transfer wheel, the cam secured under said transfer wheel will contact one end of the ratchet lever arm to release the detent at the other end of said lever arm from the ratchet wheel, then the friction drive mechanism will function and drive said timing wheel with a rotary motion and thereby move said bottle forwardly preventing any delayed action upon the conveyor chain.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An article timing mechanism comprising in combination, a continuously traveling conveyor chain upon which articles are frictionally carried, a timing wheel having prongs and pockets and located near the inlet end of said conveyor chain, a transfer wheel with pockets located near the outlet end of said conveyor chain, power means for continuously driving said conveyor chain and said transfer wheel, said means also driving said timing wheel at definite intervals through the intermediation of a friction drive coupling, a ratchet wheel connected with said timing wheel, a cam connected with said transfer wheel, suitable means operated by said cam to permit the movement of said ratchet wheel by said power means transmitted through said friction drive coupling, and the moving chain tending to place an article in a pocket of said timing wheel so that said article will be discharged under power to travel to said transfer wheel in a synchronized cycle of movement.

2. An article timing mechanism comprising in combination, a continuously traveling conveyor chain upon which articles are frictionally carried, a timing wheel having prongs and pockets and located near the inlet end of said conveyor chain, a transfer wheel with pockets located near the outlet end of said conveyor chain, power means for continuously driving said conveyor chain and said transfer wheel, said means also driving said timing wheel at definite intervals through the intermediation of a friction drive coupling, a ratchet wheel connected with said timing wheel, a cam connected by suitable means with said transfer wheel, a lever type means operated by said cam to permit the movement of said ratchet wheel by said power means transmitted through said friction drive coupling, and the moving chain tending to place an article in a pocket of said timing wheel so that said article will be discharged by force to travel to said transfer wheel in a synchronized cycle of movement.

3. A bottle timing mechanism comprising in combination, a continuously traveling conveyor chain upon which bottles are frictionally carried, a timing wheel having prongs and pockets and located near the inlet end of said conveyor chain, a transfer wheel with pockets located near the outlet end of said conveyor chain, power means for continuously driving said conveyor chain and said transfer wheel, said means also driving said timing wheel at definite intervals through the intermediation of a friction drive coupling, a ratchet wheel connected with said timing wheel, a cam connected by suitable means with said transfer wheel, a rocker arm pivoted intermediate its ends and operated by said cam to permit the movement of said ratchet wheel by said power means transmitted through said friction drive coupling, and the moving chain tending to place a bottle in a pocket of said timing wheel so that said bottle will be discharged by force to travel to said transfer wheel in a synhcronized cycle of movement.

4. An article timing mechanism comprising in combination, a continuously traveling conveyor chain upon which articles are frictionally carried, a timing wheel having prongs and pockets and located near the inlet end of said conveyor chain, a transfer wheel with pockets located near the outlet end of said conveyor chain, power means for continuously driving said conveyor chain and said transfer wheel, said means driving said timing wheel at definite intervals through the intermediation of a friction drive coupling, a ratchet wheel connected with said timing wheel, a cam connected by suitable means with said transfer wheel, a rocker arm pivoted intermediate its ends, one end thereof operated by said cam to permit the opposite end thereof to release said ratchet wheel and permit movement thereof by said power means transmitted through said friction drive coupling, and the moving chain tending to place an article in a pocket of said timing wheel so that said article will be discharged under power to travel to said transfer wheel in a synchronized cycle of movement.

5. A bottle timing mechanism comprising in combination, a continuously traveling conveyor chain upon which bottles are frictionally carried, a timing wheel having prongs and pockets and located near the inlet end of said conveyor chain, a transfer wheel with pockets located near the outlet end of said conveyor chain, power means for continuously driving said conveyor chain and said transfer wheel, said means driving said timing wheel at definite intervals through the intermediation of a friction drive coupling, a ratchet wheel mounted below and connected with said timing wheel, a cam mounted upon the under side of said transfer wheel, a rocker arm pivoted intermediate its ends, one end thereof operated by said cam to permit a detent upon the opposite end thereof to release said ratchet wheel and permit movement of said ratchet wheel by said power means transmitted through said friction drive coupling, and said moving chain tending to place a bottle in a pocket of said timing wheel so that said bottle will be discharged by force to travel to said transfer wheel in a synchronized cycle of movement.

6. An article timing mechanism comprising in combination, a continuously traveling conveyor chain upon which articles are frictionally carried, a timing mechanism frame member, a timing wheel mounted upon said frame member having prongs and pockets and located near the inlet end of said conveyor chain, a transfer wheel mounted upon said frame member having pockets and located near the outlet end of said conveyor chain, power means for continuously driving said conveyor chain and said transfer wheel, said means driving said timing wheel at definite intervals through the intermediation of a friction drive coupling, a ratchet wheel connected with said timing wheel, a cam connected by suitable means with said transfer wheel, a rocker arm pivoted intermediate its ends, one end thereof operated by said cam to permit the opposite end thereof to release said ratchet wheel and permit movement thereof by said power means transmitted through said friction drive coupling, and the moving chain tending to place an article in a pocket of said timing wheel so that said article will be discharged by force to travel to said transfer wheel in a synchronized cycle of movement.

7. A bottle timing mechanism comprising in combination, a continuously traveling conveyor chain upon which bottles are frictionally carried, a timing mechanism frame member, a timing wheel mounted upon said frame member, said timing wheel having prongs and pockets and located near the inlet end of said conveyor chain, a transfer wheel mounted upon said frame member, said transfer wheel having pockets and located near the outlet end of said conveyor chain, power means for continuously driving said conveyor chain and said transfer wheel, said means driving said timing wheel at definite intervals through the intermediation of a friction drive coupling, a ratchet wheel mounted below and connected with said timing wheel, a cam mounted upon the under side of said transfer wheel, a rocker arm pivoted intermediate its ends, one end thereof operated by said cam to permit a detent upon the opposite end thereof to release said ratchet wheel and permit movement of said ratchet wheel by said power means transmitted through said friction drive coupling, and said moving chain tending to place a bottle in a pocket of said timing wheel so that said bottle will be discharged under power to travel to said transfer wheel in a synchronized cycle of movement.

8. An article indexing mechanism for article handling mechanisms comprising in combination, a continuously traveling conveyor chain upon which articles are frictionally carried, an intermittently rotating timing wheel mounted at one side of said chain for spacing articles while being carried forward on said chain, said timing wheel being peripherally formed with alternate prongs and pockets positioned partway across the width of said chain and in the path of articles carried on said chain, said timing wheel having a ratchet wheel secured to it by suitable means, a continuously turning transfer wheel positioned at one side of said chain at some distance from said timing wheel, said transfer wheel formed with pockets to receive articles indexed by said timing wheel, a ratchet wheel control means, said means governed by the movement of said transfer wheel to allow movement of said ratchet wheel and said timing wheel to discharge any article seated in a pocket of said timing wheel, a continuously power driven means transmitting movement to said timing wheel through the intermediation of a friction drive coupling, said coupling permitting said timing wheel and said ratchet wheel to remain stationary until they are released by said ratchet wheel control means, and the movement of said timing wheel will discharge under power an article poised in a pocket thereof and allow it to travel upon said chain to said transfer wheel in a synchronized cycle of movement.

9. An article indexing mechanism for article handling mechanisms comprising in combination, a continuously traveling conveyor chain upon which articles are frictionally carried, a timing mechanism frame member, an intermittently rotating timing wheel mounted at one side of said chain for spacing articles while being carried forward on said chain, said timing wheel being peripherally formed with alternate prongs and pockets positioned partway across the width of said chain and in the path of articles carried on said chain, said timing wheel having a ratchet wheel secured beneath it by suitable means, a continuously turning transfer wheel positioned at one side of said chain at some distance from said timing wheel, said transfer wheel formed with pockets to receive articles indexed by said timing wheel, a ratchet wheel control means, said means governed by the movement of said transfer wheel to allow movement of said ratchet wheel and said timing wheel to discharge any article seated in a pocket of said timing wheel, said timing wheel with said ratchet wheel and said ratchet wheel control means all mounted upon said timing mechanism frame member, a continuously power driven means transmitting movement to said timing wheel through the intermediation of a friction drive coupling, said coupling permitting said timing wheel and said ratchet wheel to remain stationary until they are released by said ratchet wheel control means, and the movement of said timing wheel will discharge by force an article poised in a pocket thereof and allow it to travel upon said chain to said transfer wheel in a synchronized cycle of movement.

10. An article indexing mechanism for article handling mechanisms comprising in combination, a continuously traveling conveyor chain upon which articles are frictionally carried, a timing mechanism frame member, an intermittently rotating timing wheel mounted at one side of said chain for spacing articles while being carried forward on said chain, said timing wheel being peripherally formed with alternate prongs and pockets positioned partway across the width of said chain and in the path of articles carried on said chain, said timing wheel having a ratchet wheel secured beneath it by suitable means, a continuously turning transfer wheel positioned at one side of said chain at some distance from said timing wheel, said transfer wheel formed with pockets to receive articles indexed by said timing wheel, a ratchet wheel control means, said means governed by the movement of said transfer wheel to allow movement of said ratchet wheel and said timing wheel to discharge any article seated in a pocket of said timing wheel, a continuously power driven means transmitting movement to said timing wheel through the intermediation of a friction drive coupling, said timing wheel with said ratchet wheel and said ratchet wheel control means and said friction drive coupling all mounted upon said timing mechanism frame member, said coupling permitting said timing wheel and said ratchet wheel to remain stationary until they are released by said ratchet wheel control means, and the movement of said timing wheel will discharge by force an article poised in a pocket thereof and allow it to travel upon said chain to said transfer wheel in a synchronized cycle of movement.

11. A bottle indexing mechanism for bottle handling mechanisms comprising in combination, a continuously traveling conveyor chain upon which bottles are frictionally carried, an intermittently rotating timing wheel mounted at one side of said chain for spacing bottles while being carried forward on said chain, said timing wheel being peripherally formed with alternate prongs and pockets positioned partway across the width of said chain and in the path of bottles carried on said chain, said timing wheel having a ratchet wheel secured beneath it by suitable means, a continuously turning transfer wheel positioned at one side of said chain at some distance from said timing wheel, said transfer wheel formed with pockets to receive bottles indexed by said timing wheel, a timing mechanism frame member rotatably mounted beneath said transfer wheel, a ratchet wheel control means, said means controlled by the movement of said transfer wheel to allow movement of said ratchet wheel and said timing wheel to discharge any bottle seated in a pocket of said timing wheel, a continuously power driven means transmitting movement to said timing wheel through the intermediation of a friction drive coupling, said timing wheel with said ratchet wheel and said ratchet wheel control means and said friction drive coupling all mounted upon said timing mechanism frame member, said coupling permitting said timing wheel and said ratchet wheel to remain stationary until they are released by said ratchet wheel control means, and the movement of said timing wheel will discharge under power a bottle poised in a pocket thereof and allow it to travel upon said chain to said transfer wheel in a synchronized cycle of movement.

12. A bottle timing mechanism, comprising a conveyor with stationary side rails and a movable conveyor chain for advancing said bottle, a constantly rotating transfer wheel, an intermittently rotating timing wheel for timing bottles conveyed by said conveyor chain, a ratchet wheel located adjacent said timing wheel and rigidly secured thereto, said ratchet wheel and said timing wheel driven by a continuously driven shaft through the intermediation of a friction clutch, when a bottle is mispositioned on said conveyor chain and is not properly indexed to be received by said rotating transfer wheel said timing wheel is held stationary to engage and to stop the advancement of the bottle while said conveyor chain advances, and means actuatable independently of said bottle for disengaging said ratchet wheel and allowing said timing wheel to move by force said bottle when the latter is properly positioned on said conveyor.

13. A bottle timing mechanism, comprising a conveyor with stationary side rails and a movable conveyor chain for advancing said bottle, a constantly rotating transfer wheel, an intermittently rotating timing wheel for timing bottles conveyed by said conveyor chain, a ratchet wheel located beneath said timing wheel and rigidly secured thereto by suitable means, said ratchet wheel and said timing wheel driven by a continuously driven shaft through the intermediation of a friction clutch, a ratchet wheel control means located between said transfer wheel and said ratchet wheel, and when a bottle is mispositioned on said conveyor chain and is not properly indexed to be received by said rotating transfer wheel said timing wheel is held stationary to engage and to stop the advancement of the bottle while said conveyor chain advances, and said ratchet wheel control means is governed by the movement of said transfer wheel for releasing said ratchet wheel and allowing said timing wheel to move by force said bottle when the latter is properly positioned on said conveyor.

14. A bottle timing mechanism, comprising a conveyor with stationary side rails and a movable conveyor chain for advancing said bottle, a constantly rotating transfer wheel, a cam located beneath said transfer wheel and its movement governed by said transfer wheel, an intermittently rotating timing wheel for timing bottles conveyed by said conveyor chain, a ratchet wheel located below said timing wheel and rigidly secured thereto by suitable means, a rocker arm positioned between said cam and said ratchet wheel, said ratchet wheel and said timing wheel driven by a continuously driven shaft through the intermediation of a friction clutch, when a bottle is mispositioned on said conveyor chain and is not properly indexed to be received by said rotating transfer wheel said timing wheel is held stationary to engage and to stop the advancement of the bottle while said conveyor chain advances, and said rocker arm is actuated by said cam for releasing said ratchet wheel and allowing said timing wheel to move by force said bottle when the latter is properly positioned on said conveyor.

15. A bottle timing mechanism, comprising a conveyor with stationary side rails and a movable conveyor chain for advancing said bottle, a constantly rotating transfer wheel, a cam located beneath said transfer wheel and governed thereby, an intermittently rotating timing wheel for timing bottles conveyed by said conveyor chain, a ratchet wheel located adjacent said timing wheel and rigidly secured to said timing wheel, a rocker arm located between said cam and said ratchet wheel, said rocker arm having a detent at one end thereof for engaging said ratchet wheel, said ratchet wheel and said timing wheel driven by a continuously driven shaft through the intermediation of a friction clutch, when a bottle is mispositioned on said conveyor chain and is not properly indexed to be received by said rotating transfer wheel said timing wheel is held stationary to engage and to stop the advancement of the bottle while said conveyor chain advances, and said rocker arm is actuated by said cam for releasing said detent from said ratchet wheel and allowing said timing wheel to move by force said bottle when the latter is properly positioned on said conveyor.

16. A mechanism for timing bottles, comprising a continuously moving conveyor chain for supporting and advancing bottles positioned at random thereon, a continuously rotating transfer wheel, an intermittently rotating timing wheel being peripherally formed with alternate prongs and pockets, said pockets for receiving bottles from said conveyor chain, a timing mechanism frame member mounted adjacent said conveyor chain, said timing wheel mounted at one end of said frame member, said frame member pivotally mounted at the opposite end thereof, a cam mounted beneath said transfer wheel and controlled thereby, a ratchet wheel mounted between said timing wheel and said frame member and secured by suitable means to said timing wheel, a rocker arm mounted upon said frame and located between said transfer wheel and said ratchet wheel, said rocker arm having a detent at one end thereof and resiliently held against said ratchet wheel by a spring, the movement of said arm controlled by said transfer wheel, said rocker arm with said timing wheel mounted upon said frame member and movable with said frame member when it is moved from and towards said conveyor chain, said ratchet wheel and said timing wheel driven by a continuously driven shaft through the intermediation of a friction clutch, when a bottle is mispositioned on said conveyor chain and is not properly indexed to be received by said rotating transfer wheel said timing wheel is held stationary to engage and to stop the advancement of the bottle while said conveyor chain advances, and said rocker arm is actuated by said cam for releasing said detent on said arm from said ratchet wheel and allowing said timing wheel to move by force said bottle when the latter is properly positioned on said conveyor.

BENNETT W. MERRILL.

REFERENCES CITED

The following references are of record in the file of this patent:

UNITED STATES PATENTS

| Number | Name | Date |
| --- | --- | --- |
| 2,536,250 | Archer | Jan. 2, 1951 |